United States Patent Office 3,579,362
Patented May 18, 1971

3,579,362
DIELECTRIC 3NiO·X$_2$O$_3$·6TiO$_2$ COMPOSITIONS
Russell G. West, Alexandria, Va. (% Trans-Tech, Inc., 12 Meem Ave., Gaithersburg, Md. 20760)
No Drawing. Filed Oct. 20, 1969, Ser. No. 867,910
Int. Cl. C04b 33/00
U.S. Cl. 106—39                              7 Claims

ABSTRACT OF THE DISCLOSURE

The ceramic dielectric composition of about 30 mole percent NiO, about 10 mole percent of Al$_2$O$_3$, Fe$_2$O$_3$ or mixtures thereof, and about 60 mole percent TiO$_2$ is disclosed. The composition is a high dielectric constant value, stable, passive, low loss dielectric medium which may be used in microwave device applications.

BACKGROUND OF THE INVENTION

Ceramic dielectric compositions have previously been used in the microwave field, including such uses as components in guided wave applications, including radar. However, the prior art commercial products have not included a composition with a dielectric constant of greater than 18 without having excessive dielectric losses, i.e., greater than 0.0005 dielectric loss tangent value (measured at a microwave frequency of 9.5 gHz.).

The Verwey U.S. Pat. 2,616,859 discloses the production of resistances using, in Example 1 thereof, a composition based on the composition formula 1.5NiO·0.375Fe$_2$O$_3$·0.75TiO$_2$ The Oshry U.S. Pat. 2,695,239 discloses barium titanate capacitors containing small amounts of iron or nickel. The Harman et al. U.S. Pat. 2,776,896 discloses ceramic compositions having high thermal shock resistance based on compositions containing various proportions of Al$_2$O$_3$·TiO$_2$ and Fe$_2$O$_3$·TiO$_2$. The Deschamps U.S. Pat. 3,291,739 discloses a ferrite composition, which is not analogous to ceramic dielectric compositions, which includes a composition, in Example 2 thereof, of 50NiO, 25Fe$_2$O$_3$, 25(TiO$_2$NiO).

SUMMARY OF THE INVENTION

Ceramic dielectric compositions are produced by firing a composition comprising about 30 mole percent NiO, about 10 mole percent of Al$_2$O$_3$, Fe$_2$O$_3$ or mixtures thereof, and about 60 mole percent TiO$_2$. The resultant dielectric composition has a dielectric constant of about 30 and a dielectric loss tangent value of less than 0.0005, generally less than 0.0002.

DETAILED DESCRIPTION OF THE INVENTION

Ceramic dielectric mediums of the general composition of the formula:

3NiO·X$_2$O$_3$·6TiO$_2$ wherein X$_2$O$_3$ represents Al$_2$O$_3$, Fe$_2$O$_3$, or mixtures thereof, have high dielectric constant values with low dielectric loss tangent values. A typical composition would have a dielectric constant of about 30, with a dielectric loss tangent value of less than 0.0002. Such compositions are useable in microwave applications, and especially in the construction of components for guided wave applications, such as in radar.

The NiO may be substituted, in part, with minor amounts of the oxides of Mn, Mg, Zn or other divalent metals. The TiO$_2$ may be substituted in part with minor amounts of other tetravalent metals, such as SiO$_2$, but the dielectric constant values or other physical properties will generally decrease with such substitution.

The dielectric compositions of the present invention can be produced by conventional processes. In one process, for example, the carefully weighed raw materials are first wet mixed with water, in a steel ball mill which preferably has a rubber or plastic lining. Other blending apparatus, such as high-speed blenders, colloid mills and attritors may be used. The resultant homogeneous mixture is then oven dried or spray dried. In this drying operation, water should be removed quite rapidly in order to minimize preferential settling of denser or larger particles. If desired, the mixture may be pressure filtered before drying to expedite water removal.

The dried material may then be presintered, or calcined, by heat treating at a temperature somewhat lower than the final firing temperature. This presintering step generally helps control shrinkage in the final stage and improves homogeneity. All or any portion of the material may be presintered, as desired, as known to the art. After the presintering step, the material is comminuted to a particle size that is ceramically workable, preferably about two microns or less in size.

Several means of forming the comminuted particles into the desired shapes may be utilized, including die pressing, extruding and hydrostatic or isostatic pressing. Organic additives may be introduced at this point to serve as a binder and particle lubricant, as desired.

The ceramic dielectric compositions are produced by a solid state reaction at temperatures of 1100 to 1500° C. If an organic additive is used, the formed shapes must be heated gradually during the low temperature range in the firing cycle in order to slowly volatize the organic additive, as rapid evolution of vapors may crack the formed shapes.

Hot pressing, which involves the simultaneous pressing and firing of the dielectric, may be used to advantage in many instances. The concurrent application of heat and pressure generally produces good control of density and crystal grain size.

It is known that dielectric materials are generally susceptible to changes in oxygen content during firing. It is therefore preferred to control the chemical valence of the compounds by precise firing schedules and controlled atmospheres during the heat treatment, as known to the art.

The dielectric compositions can be produced by the methods disclosed in U.S. Pats. Nos. 3,131,082, 3,062,746, or 3,051,656, the disclosures of which are hereby incorporated by reference.

The preferred dielectric compositions of the present invention will have the general formula 3NiO·Fe$_2$O$_3$·6TiO$_2$ or 3NiO·Al$_2$O$_3$·6TiO$_2$ or mixtures thereof. As previously mentioned, minor amounts of divalent metals may be substituted for a portion of the Ni, and minor amounts of tetravalent metals may be substituted for a portion of the Ti. Such replacements or substitutions will be worked by way of additions of the respective oxides, or precursors thereof, in lieu of the replaced or substituted oxides.

It is to be emphasized that any formulas used herein are conjectural, as it has not been established that the dielectric composition of the present invention is a single phase system. Therefore, the formulas herein are to be considered to represent amorphous compositions and merely indicate the ratios of starting materirals in such compositions.

The invention will be understood more readily by reference to the following examples; however, these examples are intended to illustrate the invention and are not to be construed to limit the scope of the invention.

EXAMPLE 1

The following oxides are measured out in the proportions indicated:

| | Quantity, grams |
|---|---|
| $TiO_2$ | 55.54 |
| NiO | 25.96 |
| $Fe_2O_3$ | 18.50 |

These amounts and proportions correspond to 100 gram-weight percent of the composition:

$$3NiO \cdot Fe_2O_3 \cdot 6TiO_2$$

The weighted oxides are mixed together in a "Waring Blendor" with 150 ml. of distilled water for 15 minutes. The mixed slurry is placed in a covered steel pan and heated to evaporate the water in approximately 20 minutes. The dried cake is then calcined in air at 1000° C. for 15 hours. The calcined powder is then ball-milled for 10 hours in a 500 ml. polyethylene jar containing a ⅓ volume charge of ⅜" stainless steel balls and 120 ml. of distilled water. As is well known in the art, excess iron picked up during ball milling should be accounted for in the initial weighting of the oxides. The milled slurry is again dried in a steel pan. The dried powder is next granulated by forcing it through a No. 20 sieve, and pressed into compacts in dies. The compacts are finally sintered in air at a temperature of 1475° C. for 15 hours. The final composition had a dielectric constant of 30.2 and a dielectric loss tangent value of 0.0001.

EXAMPLE 2

The following oxides are measured out in the proportions indicated:

| | Quantity, grams |
|---|---|
| $TiO_2$ | 59.52 |
| NiO | 27.82 |
| $Al_2O_3$ | 12.66 |

These amounts and proportions correspond to 100 gram-weight percent of the formula:

$$3NiO \cdot Al_2O_3 \cdot 6TiO_2$$

The weighted oxides are mixed together in a "Waring Blendor" with 150 ml. of distilled water for 15 minutes. The mixed slurry is placed in a covered steel pan and heated to evaporate the water in approximately 20 minutes. The dried cake is then calcined in air at 1000° C. for 15 hours. The calcined powder is then ball-milled for 10 hours in a 500 ml. polyethylene jar containing a ⅓ volume charge of ⅜" stainless steel balls and 120 ml. of distilled water. As is well known in the art, iron picked up during ball milling may be found in the final product and may be considered in the initial charge of raw materials. The milled slurry is again dried in a steel pan. The dried powder is next granulated by forcing it through a No. 20 sieve, and pressed into compacts in dies. The compacts are finally sintered in air at a temperature of 1500° C. for 15 hours.

EXAMPLE 3

This example relates to the effect that minor changes in molar proportions have upon the composition of Example 2. The compositions described in the accompanying Table I were produced using the process described for Example 2, and using as a standard the composition of Example 2. Each starting material change has been converted into the appropriate molar change, based on the formula $3NiO \cdot Al_2O_3 \cdot 6TiO_2$, and in each instance represents a 10% deficiency or excess of the ingredient in question. From an examination of the results of this example, as shown in Table I, it will be appreciated that in most instances a molar variation of plus or minus 10 molar percent of the ingredients of the composition of the present invention can be made without appreciable adverse effect. The results shown in Table I suggest that even greater molar composition changes could be made e.g., plus or minus 25 percent, and still produce a useful product which, however, would not be within the preferred ranges herein. Similar results would be expected for the composition $3NiO \cdot Fe_2O_3 \cdot 6TiO_2$ and compositions based on mixtures of $Fe_2O_3$ and $Al_2O_3$.

TABLE I

Effect of small changes in molar composition on dielectric properties of $3NiO \cdot 1Al_2O_3 \cdot 6TiO_2$ of Example 2

| | $\epsilon'$ | Tan δ |
|---|---|---|
| Example 2 (standard) | 30.3 | .0001 |
| 0.6 mol $TiO_2$ deficient | 26.4 | .0001 |
| 0.6 mol $TiO_2$ excess | 28.8 | .0001 |
| 0.1 mol $Al_2O_3$ deficient | 30.8 | .0001 |
| 0.1 mol $Al_2O_3$ excess | 31.8 | .0001 |
| 0.3 mol NiO deficient | 28.2 | .0001 |
| 0.3 mol NiO excess | 26.7 | .0001 |

NOTE.—All tests at 9.4 gHz. and at ambient conditions.

Obviously many modifications and variations of the present invention are possible in the light of the above teachings. It is, therefore, to be understood that within the scope of the appended claims, the invention may be practiced otherwise than as specifically described.

What is claimed is:

1. A ceramic dielectric composition consisting essentially of about 30 mole present NiO, about 10 mole percent of/a member selected from the group consisting of $Al_2O_3$, $Fe_2O_3$, and mixtures thereof, and about 60 mole percent $TiO_2$, said dielectric composition having a dielectric constant greater than 18 and a dielectric loss tangent value of less than 0.0005.

2. The composition as claimed in claim 1, wherein said member is $Fe_2O_3$.

3. The composition as claimed in claim 1, wherein said member is $Al_2O_3$.

4. The composition as claimed in claim 1, wherein said composition has a dielectric constant of about 30.

5. The composition as claimed in claim 4, wherein said composition has a dielectric loss tangent value of less than 0.0002.

6. The composition as claimed in claim 5, wherein said member is $Fe_2O_3$.

7. The composition as claimed in claim 5, wherein said member is $Al_2O_3$.

References Cited

UNITED STATES PATENTS

| 2,776,896 | 1/1957 | Harman et al. | 106—39 |
| 3,052,634 | 9/1962 | Jack et al. | 252—62.5 |
| 3,291,739 | 12/1966 | Deschamps | 252—62.59X |

HELEN M. McCARTHY, Primary Examiner

W. R. SATTERFIELD, Assistant Examiner

U.S. Cl. X.R.

106—46; 252—62.51, 62.59, 519, 520

UNITED STATES PATENT OFFICE
CERTIFICATE OF CORRECTION

Patent No. 3,579,362          Dated May 18, 1971

Inventor(s) Russell G. West

It is certified that error appears in the above-identified patent and that said Letters Patent are hereby corrected as shown below:

Claim 1, line 2, "present" should be --percent--.

Signed and sealed this 4th day of July 1972.

(SEAL)
Attest:

EDWARD M. FLETCHER, JR.          ROBERT GOTTSCHALK
Attesting Officer                Commissioner of Patents

UNITED STATES PATENT OFFICE
CERTIFICATE OF CORRECTION

Patent No. 3,579,362      Dated May 18, 1971

Inventor(s) Russell G. West

It is certified that error appears in the above-identified patent and that said Letters Patent are hereby corrected as shown below:

Claim 1, line 2, "present" should be --percent--.

Signed and sealed this 4th day of July 1972.

(SEAL)
Attest:

EDWARD M. FLETCHER, JR.
Attesting Officer

ROBERT GOTTSCHALK
Commissioner of Patents